United States Patent [19]

Hennessy

[11] Patent Number: 4,654,513

[45] Date of Patent: Mar. 31, 1987

[54] NEWSPAPER VENDING MACHINE

[75] Inventor: Michael K. Hennessy, Chambersburg, Pa.

[73] Assignee: Hennessy Products, Inc., Chambersburg, Pa.

[21] Appl. No.: 760,892

[22] Filed: Jul. 31, 1985

[51] Int. Cl.⁴ .............................................. G06F 7/08
[52] U.S. Cl. ..................................... 235/381; 235/449
[58] Field of Search ............................. 235/449, 381, 487

[56] References Cited

U.S. PATENT DOCUMENTS 4,389,564  6/1983  Flair .................................. 235/487 X

*Primary Examiner*—Harold I. Pitts
*Attorney, Agent, or Firm*—Daniel J. O'Connor

[57] ABSTRACT

A single copy newspaper vending machine in which a telescoping rod assembly is activated via a comparative and memory electronic circuit. Data is read into the circuit by means of a magnetic card and reader. The apparatus and method provide a guaranteed newspaper sale since the magnetic card must be utilized by the subscriber in a specified machine and on a specified date. The system results in increased advertising revenues for newspaper publishers and in added convenience for newspaper subscribers.

6 Claims, 2 Drawing Figures

NEWSPAPER VENDING MACHINE

BACKGROUND OF THE INVENTION

The concepts of the invention were previously set forth by applicant in Disclosure Document No. 138,252, said document being incorporated herein by reference.

This invention relates generally to newspaper vending machines of a specialized type in which only a single copy of a newspaper may be obtained by a user upon appropriate activation of the vending machine.

Single copy newspaper vending machines are known in the prior art as illustrated by U.S. Pat. No. 4,506,800, said patent being assigned to the owner of all rights in the present invention.

Such single copy dispensers have proven to be a valuable and reliable means for reducing theft losses in the industry. However, the problem remains with all newspaper vending machines that they do not provide a guaranteed sale as do the home subscriptions carried by a newspaper.

In the newspaper industry, it is known that approximately 80% of a newspaper's income revenues are from advertisers with the remaining 20% of revenue coming from newspaper sales. Of the newspaper sales made by a typical newspaper, 80% are via home delivery paid subscription and 20% are single copy sales via machine or over-the-counter.

It is apparent that the higher the demonstrable circulation of a newspaper, the more can be charged for advertising rates which constitute the major source of newspaper publisher income.

Circulation figures of member newspaper publishers are recorded by a national organization known as the Audit Bureau of Circulation (ABC) and such figures are made available to advertisers. It is known in the art that advertisers generally base advertising decisions upon the home delivery circulation figures of a newspaper and not upon the single copy vending machine sales. This is because the home delivery figures represent a guaranteed penetration of the market and the single copy vending machine sales do not.

Thus, while newspaper publishers have, for customer convenience and newspaper exposure, long felt a need to have a vending machine network, vending machine sales have not traditionally enhanced the important advertising revenues since such sales are not guaranteed.

It would, therefore, be of great significance in the art to provide a newspaper vending machine system and method which would provide a guaranteed sale, i.e. the equivalent of a home delivery pre-paid subscription.

It has also been known in the art that home delivery to newspaper subscribers in large apartment and condominium buildings has suffered the drawback of repeated newspaper theft and consequent customer complaints and subscription cancellations. It would thus be of consequence in the art if such apartment home delivery could be accomplished in a more reliable and effective manner.

OBJECTS OF THE INVENTION

Accordingly, it is a primary objective of the present invention to provide a single copy newspaper vending machine having incorporated therein a novel system and method whereby a guaranteed sale of the newspaper product is provided, thus enhancing advertising revenues for the newspaper publisher.

It is a further object of the present invention to provide a newspaper vending machine wherein the risk of money theft and consequent machine damage is eliminated.

It is a still further object to provide a system of newspaper delivery to apartment and condominium dwellers which includes convenience of use and elimination of newspaper theft in such environs.

Further objects and advantages of the present invention will become apparent as the following description proceeds, and the features of novelty characterizing the invention will be pointed out with particularity in the claims annexed to and forming a part of this specification.

BRIEF SUMMARY OF THE INVENTION

The system of the present invention utilizes the mechanical operation of that disclosed in U.S. Pat. No. 4,506,800, the assignee being the same in said patent and this application. That is, newspapers are stacked in an angled fashion so that, when a telescoping member is lowered, the topmost newspaper falls by gravity to a lower exit area. The newspaper, as it slides out of the stack, passes over a switch which generates a signal to stop the downward motion of the telescoping member so that the remaining papers are held securely in the stack until the next operation. System activation in U.S. Pat. No. 4,506,800 is by coin insertion.

In the present invention, in place of the traditional coin operation of the vending machine, a magnetic card and card reader are utilized.

Information is pre-encoded onto the magnetic card of the newspaper subscriber and, when the card is appropriately placed in the vending machine card reader, a comparision of relevant data is made via printed circuit board comparative circuitry. If all of the required circuit demands are met, a single copy of the newspaper is dispensed to the vending machine user.

The invention utilizes readily available magnetic card, card reader, and printed circuit board comparative logic and memory technology.

The heart of the invention lies in the particular data analyzed and in the fact that such data use results in a guaranteed sale of the newspaper in contrast to vending machines currently in use.

DETAILED DESCRIPTION OF THE INVENTION

Figure 1:
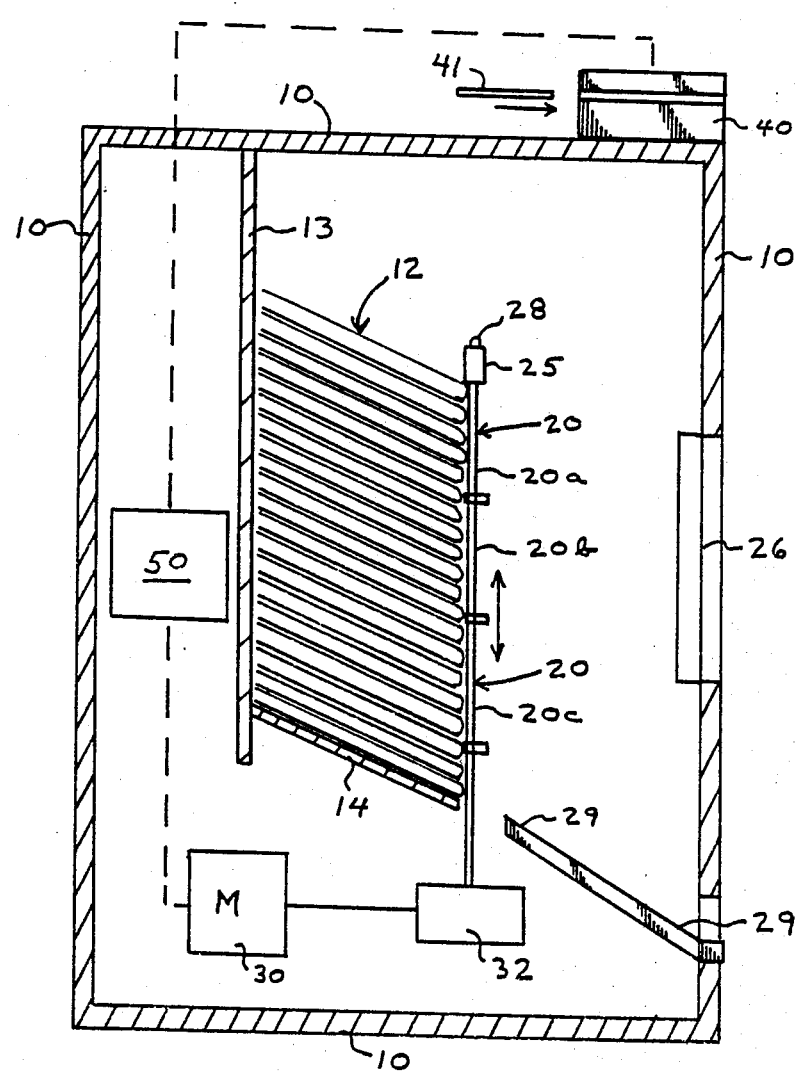
FIG. 1 shows, in side elevational schematic view, the dispensing mechanics and electronic control means utilized to operate said dispensing mechanics.

As shown in the schematic view of FIG. 1, the stack of newspapers 12 to be machine vended are loaded onto an angled lower support element 14. A rear newspaper support wall 13 provides for vertical alignment of the newspapers in conjunction with the front telescoping rods 20a, 20b, and 20c, the telescoping assembly generally being indicated by numeral 20.

A front newspaper display window 26 is located in the exterior vending machine housing 10 as is known in the art.

As has been completely described in U.S. Pat. No. 4,506,800, of common assignment with the present invention, telescoping rods 20a, 20b and 20c are lowered via the action of gearing indicated at numeral 32, said gearing being driven by actuating motor 30. As described in said patent, a chain drive would normally interconnect gearing 32 and the telescoping rod assembly 20.

Upon receiving the appropriate signal, motor 30 acts on gearing 32 to lower the telescoping rod sections 20 and thus the upper paper retaining lip 25 by an amount sufficient to allow the top newspaper in stack 12 to slide over lip 25.

As the newspaper slides by gravity force over the lip 25, it also passes over a switch 28 which signals motor 30 to cease operation. The single dispensed top newspaper then falls into the dispensing chute 29 and is available to the purchaser.

As previously described in the assignee's prior Pat. No. 4,506,800, the activation of motor 30 is conventionally accomplished by the deposit of the appropriate coinage amount into the vending machine 10.

In the present invention, however, activation of motor 30 is signaled via comparative and memory circuitry indicated schematically at numeral 50, the logic of which is described with reference to FIG. 2.

Data is fed into the comparative and memory circuitry 50 by means of a standard card reader 40 which reads data supplied on the card 41 of the newspaper purchaser.

In the process of the invention, at least the following data is pre-encoded onto the magnetic card 41: the vending machine code, the subscriber code, and the dates for which the magnetic card 41 may be properly used to purchase a newspaper.

The vending machine code is utilized when it is desired to limit the purchaser to a particular machine or group of machines. For example, if a purchaser had a vending machine code number of 90 on the magnetic card 41, such card could only be used in a machine or machines having a code number of 90 registered onto the comparative and memory circuitry 50. In this usage, a newspaper publisher would know in advance exactly how many persons had subscribed to the machine code 90 on a particular day and could thereby place exactly the correct number of papers in the machine, thereby avoiding any wastage.

The subscriber code would be such that each subscriber has a different number. This individual number would be read off of card 41 and compared and stored in the circuitry 50. If the subscriber had already used his subscription that day, it would be retained in memory section 53 of logic circuitry 50. If a repeated card use if attempted, logic circuitry 50 would not give a dispense command. Once every twenty-four hours, a silent alarm 58 would reset the subscriber code memory so that, on a subsequent day, a paper could be dispensed.

The third data set to be pre-encoded on the magnetic card 41 would be the appropriate day and date of the subscription. For example, if a subscriber wished to purchase the newspaper only during each day of May, 1986, the appropriate codes would be entered onto card 41 at the time of subscription. Circuitry 50 has a date counting system as a part thereof so that a comparison of the magnetic card date and the actual date could be made and, in the example given, a paper would be dispensed only during May of 1986 when using that particular card.

It should be here noted that the comparative and memory circuitry 50 described above is known generally in the electronic arts and does not per se form a part of this invention. The essence of the present invention lies in the new use of such technology in combination with a single copy newspaper dispenser in a manner which results in a novel and highly effective system and method whereby a newspaper published may achieve a guaranteed sale or the equivalent of a home delivery while still using a vending machine.

Figure 2:
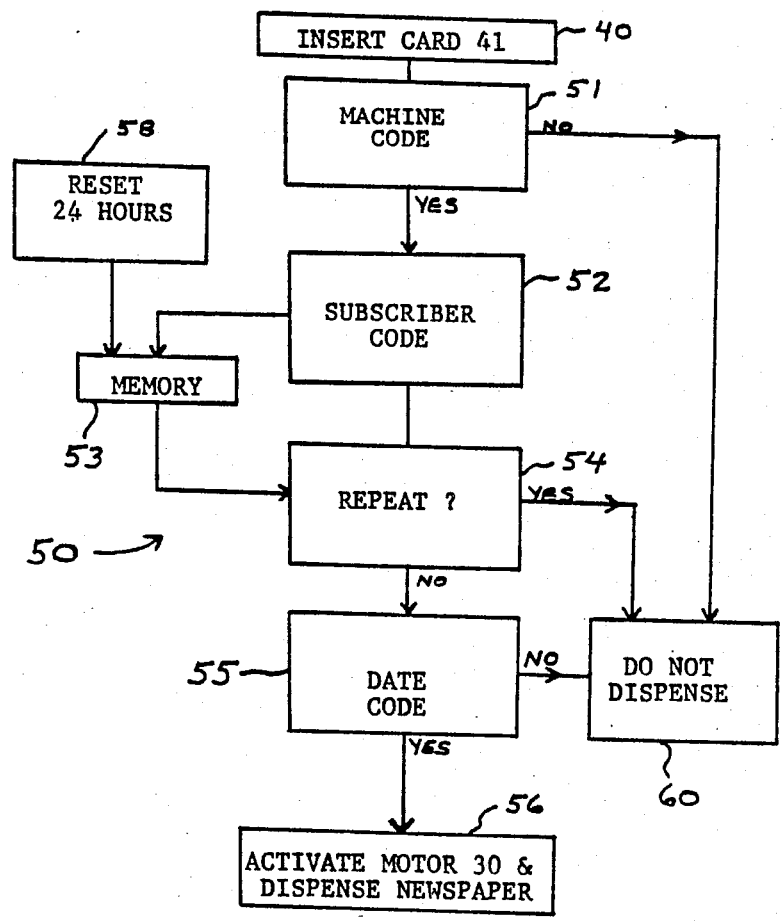
FIG. 2 shows, in block diagram form, the logic of the comparative circuitry utilized to operate the newspaper vending machine.

The logic utilized in the conventional comparative circuitry of numeral 50 may best be understood in the logic block diagram of FIG. 2.

As shown in FIG. 2, after the magnetic card 41 is inserted into the card reader 40, a machine code which has been pre-entered onto card 41 is compared with an existing machine code in logic circuitry 50. See numeral 51 of FIG. 2. If the machine code read and compared by circuitry 50 is not correct, a newspaper will not be dispensed.

Further, a subscriber code 52 is read from the card 41 so that a subscriber may only receive one newspaper per day. This function is accomplished by storing the subscriber code into a memory portion 53 of circuitry 50 and, if a second attempt is made to activate the vending machine during a 24 hour cycle period, it will not dispense a second newspaper in response to this particular card. See the "Repeat ?" block 54 of FIG. 2. Every 24 hours, a silent alarm 58 resets the memory 53 of circuitry 50 so that, on a subsequent day, the card 41 will be effective to activate the machine for one time only.

Another comparison made by circuitry 50 is that of a date comparison as shown in FIG. 2 at block 55. In use of the invention, it is contemplated that multiple subscription dates would be pre-encoded onto the magnetic card 41. Conventional calendar clock timer elements, known in the art, are a part of circuitry 50. Thus, if a subscription code date of May 15, 1986 were encoded on card 41 and the calendar timer indicates a date of May 15, 1986, then activation of the dispensing motor 30 would be accomplished through conventional switching circuitry assuming that the previously mentioned requirements had also been satisfied.

In considering the above disclosed invention, it is important to realize that the system and method described is not a mere debit operation in which a magnetic card may be used on any date selected by the newspaper subscriber. Rather, the invention encompasses a system whereby the magnetic card must be used on specific pre-encoded dates. Thus, a guaranteed newspaper sale is in effect produced which will be considered the equivalent of a home delivery subscription.

As described in the Background of the Invention, such guaranteed sale procedure is important since it results in a higher advertising circulation and therefore increased advertising rates for the newspaper publisher.

In addition to the above described advantages, the magnetic card operated newspaper vending machine is highly useful in areas where coinage theft and consequent machine damage are encountered.

It has also been found in use of the invention that subscribers in large apartment buildings or condominiums prefer to use such a system in areas where a door newspaper delivery has present problems.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A newspaper vending machine comprising:

an outer housing (10) having mounted therein a vertical wall (13) and a slanted wall (14), said walls cooperating to provide a slanted stacking of newspapers (12) to be dispensed, a telescoping rod assembly (20) means mounted to hold a newspaper stack (12) in a predispensed position within said housing (10), lip means (25) at an upper portion of said telescoping rod assembly (20), motor means (30) mounted within said housing (10) for activating said telescoping rod assembly (20) and the attached lip means (25) whereby a top newspaper in stack (12) is caused to slide by gravity force over said lip means upon lowering of said telescoping rod assembly, comparative and memory circuit means (50) for activating said motor means (30), magnetic card reader means (40) for supplying newspaper dispensing data to said comparative and memory circuit means (50), said magnetic card reader means (40) being capable of reading data input means from a pre-encoded magnetic card (41), said data input means comprising a machine code number (51) whereby the magnetic card (41) will be effective to operate only a given newspaper vending machine, said data input means further comprising a subscriber code number (52) and wherein said comparative and memory circuit means (50) includes means whereby only a single newspaper may be dispensed by a particular magnetic card (41) during a given twenty-four hour period, said data input means further comprising subscription date coding and wherein said comparative and memory circuit means (50) includes a calendar date cycle means (55) for comparison with said subscription date input data whereby a newspaper (12) will only be dispensed if the appropriate date is encoded on the magnetic card (41).

2. The apparatus of claim 1 including a switch means (28) mounted at an upper portion of said telescoping rod assembly (20), said switch means (28) serving to stop motor (30) operation upon passage of a single newspaper (12) over said switch (28).

3. The apparatus of claim 1 including a dispensing chute (29) mounted at a lower portion of said housing (10) and a display window (26) formed at a central portion of said housing.

4. The apparatus of claim 1 wherein said comparative and memory circuit means (50) includes means (58) for automatically resetting the subscriber code memory whereby a newspaper may be dispensed on subsequent days utilizing the same subscriber code.

5. A method of dispensing newspapers from a vending machine comprising:

stacking a plurality of newspapers (12) in a vending machine (10), operating said vending machine by comparative and memory circuit means (50), reading data into said comparative and memory circuit means by way of a magnetic card reader (40) and a magnetic card means (41), said data read into said circuit means (50) comprising a subscriber code number (52) and a subscription date code (55), said circuit means (50) including means (53) for storing the subscriber code number for a fixed period so that a second newspaper cannot be obtained by using the same magnetic card means (41) during said fixed period, said circuit means (50) further including a date calendar means (55) for comparison to the subscription date code read in via magnetic card means (41).

6. A vending machine apparatus for dispensing substantially flat materials comprising:

means for stacking said flat materials (12), means for releasing said flat materials comprising a telescoping rod assembly (20), means for operating said telescoping rod assembly in response to comparative and memory circuit means (50), means for reading data into said circuit means (50) comprising a magnetic card reader (40) and a pre-encoded magnetic card (41), said data read into said circuit means (50) comprising a subscriber code number (52) and a subscription date code (55), said circuit means (50) including means (53) for storing the subscriber code number for a fixed period so that a second newspaper cannot be obtained by using the same magnetic card means (41) during said fixed period, said circuit means (50) further including a date calendar means (55) for comparison to the subscription date code read in via magnetic card means (41).

* * * * *